(12) United States Patent
Nakamura et al.

(10) Patent No.: US 7,981,190 B2
(45) Date of Patent: Jul. 19, 2011

(54) ULTRAFINE ALLOY PARTICLES, AND PROCESS FOR PRODUCING THE SAME

(75) Inventors: Keitaroh Nakamura, Saitama (JP); Takashi Fujii, Saitama (JP)

(73) Assignees: Nisshin Seifun Group Inc., Tokyo (JP); Nisshin Engineering Inc., Tokyo (JP)

( * ) Notice: Subject to any disclaimer, the term of this patent is extended or adjusted under 35 U.S.C. 154(b) by 724 days.

(21) Appl. No.: 11/934,127

(22) Filed: Nov. 2, 2007

(65) Prior Publication Data

US 2008/0105083 A1    May 8, 2008

(30) Foreign Application Priority Data

Nov. 2, 2006  (JP) ................................. 2006-299398

(51) Int. Cl.
*B22F 9/04*    (2006.01)
(52) U.S. Cl. ........................................................ 75/346
(58) Field of Classification Search ...................... 75/346
See application file for complete search history.

(56) References Cited

U.S. PATENT DOCUMENTS

| 4,533,383 A * | 8/1985 | Miura et al. ................... 75/351 |
| 4,812,166 A * | 3/1989 | Saiki et al. ..................... 75/346 |
| 5,221,322 A * | 6/1993 | Tokuoka et al. ................ 75/346 |
| 6,379,419 B1 * | 4/2002 | Celik et al. .................... 75/346 |
| 6,444,009 B1 * | 9/2002 | Liu et al. ....................... 75/332 |
| 6,582,763 B1 | 6/2003 | Nishimura et al. ........... 427/216 |

FOREIGN PATENT DOCUMENTS

| JP | 5-43791 | 7/1993 |
| JP | 2000-219901 | 8/2000 |

* cited by examiner

*Primary Examiner* — Roy King
*Assistant Examiner* — Ngoclan T Mai
(74) *Attorney, Agent, or Firm* — Whitham Curtis Christofferson & Cook, PC

(57) ABSTRACT

The Ultrafine alloy particles of an alloy includes a primary metal and one or more subsidiary metals solid-soluble in said primary metal, a content of the one or more subsidiary metals is in a range of 1 wt % to 25 wt % and the one or more subsidiary metals solid-solved in the primary metal inhibit coalescence or oxidation of the ultrafine alloy particles including the primary metal, or both. The process introduces powder materials including the primary metal and the one or more subsidiary metals for producing the ultrafine alloy particles into a thermal plasma flame under reduced pressure to form a vapor-phase mixture and introduces a cooling gas toward an end portion of the thermal plasma flame in a supply amount sufficient for quenching the vapor-phase mixture so as to generate the ultrafine alloy particles.

2 Claims, 7 Drawing Sheets

US 7,981,190 B2

ULTRAFINE ALLOY PARTICLES, AND PROCESS FOR PRODUCING THE SAME

The entire contents of the documents cited in this specification are herein incorporated by reference.

BACKGROUND OF THE INVENTION

The present invention relates to ultrafine alloy particles capable of preventing coalescence and inhibiting oxidation and a process for producing the same. More particularly, the present invention relates to ultrafine alloy particles including a primary metal and one or more subsidiary metals solid-soluble in the primary metal obtained by a thermal plasma method, and a process for producing such the ultrafine alloy particles. The primary metal and the one or more subsidiary metals can be specifically exemplified as a primary metal A and one or more metals selected from a plurality of metals B, C and so forth solid-soluble in the primary metal A.

Fine particles such as oxide fine particles, nitride fine particles, and carbide fine particles have been used in the production of sintered bodies, for example, electrical insulating materials for semiconductor substrates, printed wiring boards, and various electrically insulating parts, materials for high-hardness and high-precision machining tools such as dies and bearings, functional materials for grain boundary capacitors, humidity sensors and the like, or precision sinter molding materials, and in the production of thermal sprayed parts, for example, engine valves, of materials that are required to be wear-resistant at a high temperature, as well as in the fields of electrodes, electrolytic materials, and various catalysts for fuel cells. Use of such fine particles improves bonding strengths between different ceramics or different metals in a sintered body or thermal sprayed part, or denseness or functionality thereof.

One of the methods for producing such fine particles is a vapor-phase method. The vapor-phase method includes a chemical method that involves chemically reacting various gases or the like at high temperatures and a physical method that involves applying an electron beam or laser beam to substances to decompose or evaporate the substances so as to form fine particles.

An example of the vapor-phase method is a thermal plasma method. The thermal plasma method is a method of producing fine particles by instantaneously evaporating a raw material in thermal plasma and then quenching and condensing/solidifying the evaporated material to produce fine particles. This method has many advantages such as high cleanness, high productivity, applicability to high melting point materials because of high heat capacity at high temperatures, and easy preparation of composite material particles as compared with other vapor-phase methods. Therefore, the thermal plasma method is often used as a method of producing fine particles.

With regard to the introduction of a powdered material into a thermal plasma flame, JP 2000-219901 A describes a method of producing oxide coated fine metal particles, involving combining fine metal particles with a powdery raw material for a coating layer, supplying the resultant material mixture into a thermal plasma (i.e., thermal plasma flame) of an inert or reducing atmosphere to evaporate the materials to obtain a vapor-phase mixture, and then quenching the vapor-phase mixture. The oxide coated fine metal particles described in JP 2000-219901 A have an average core particle size of 0.01 to 1 µm and an average thickness of oxide coatings of 1 to 10 nm. Thus, the approximate size of the oxide coated fine metal particles is 0.011 to 1.01 µm. Furthermore, surfaces of the oxide coated fine metal particles are coated with an oxide so that their surface activity is kept low, resulting in stable fine particles.

Recently, it has been increasingly required that the above-mentioned various fine particles should have smaller sizes regardless of their material.

This is because a target for which the fine particles are used is required to be of a smaller size. Here, there arises a problem in that the smaller the size of the fine particles becomes, the higher the surface activity becomes, which conversely decreases the stability of the fine particles.

For example, when metals such as iron and copper are converted into fine particles, it is well known that slowly oxidizing fine particles each having a size on the order of several micrometers (µm) result in formation of an oxide film thereon. However, in a case of fine particles each having a size on the order of few nanometers (nm) to several tens nanometers (nm) (that is, nanoparticles; hereinafter, referred to as "ultrafine particles" in order to distinguish them from the conventionally used "fine particles" designated based on sensory distinction), oxidation occurs abruptly which may even be dangerous.

Further, particularly when a low melting point metal such as gold and silver is formed into fine particles, it is known that the melting point of the metal decreases abruptly when the particle size is on the order of a few nanometers (nm). It is also known that the particles would readily be coalesced together even when the particle size is larger on the order of several tens nanometers (nm), and it becomes difficult to obtain ultrafine particles that are independent of each other.

It is therefore required to establish a process for stably and efficiently producing the ultrafine particles.

The technique described in JP 05-043791 B, for example, can be referred to for such the process.

The technique described in JP 05-043791 B is to perform vacuum deposition in the presence of a reactive gas to form carbon atom layers of a uniform thickness (i.e., an ultrafine layer on the order of few atoms to several tens atoms) on the surfaces of ultrafine powder particles (as cores), thereby providing "ultrafine powder whose particles are coated with a carbon ultrathin film".

SUMMARY OF THE INVENTION

The method of producing "ultrafine powder whose particles are coated with a carbon ultrathin film" described in above JP 05-043791 B involves having the ultrafine powder such as ultrafine nickel powder with a particle size of a few tens nanometers (nm) (e.g., 30 nm (300 Å)) that has previously been formed in an atmosphere for vapor deposition, and uniformly depositing atomic carbon (i.e., carbon atoms) generated as a result of decomposition of a reactive gas present in the atmosphere onto the surfaces of ultrafine powder particles in a thickness of a few nanometers (e.g., 2 nm (20 Å)).

In the development of semiconductor devices and the like, ultrafine particles (substantially, ultrafine metal particles) having conductivity are increasingly required in response to the demands for wiring on semiconductor substrates or printed wiring boards.

However, although JP 05-043791 B describes "ultrafine powder whose particles are coated with a carbon ultrathin film" with a particle diameters on the order of tens nanometers, the ultrafine powder has its particle surfaces coated with a carbon thin film (an ultrathin film of carbon atoms in a form of graphite) as described above, so the ultrafine powder would have to be heated to remove the carbon thin film, or evaporate carbon atoms, in order to form wirings on the semiconductor substrates or printed wiring boards. For this purpose, the ultrafine powder needs to be heated to a high temperature, but there is a limit in raising a heating temperature applied to semiconductor substrates or printed wiring boards. Therefore, a problem lies in the fact that the ultrafine powder cannot be used to form wirings on semiconductor substrates or printed wiring boards.

More particularly, the "ultrafine powder whose particles are coated with a carbon ultrathin film" described in JP 05-043791 B had a problem that the ultrafine powder does not satisfy the demands for wirings as described above which require particle surfaces to be substantially metallic (to thus impart conductivity also to the particle surfaces).

The present invention has been made in view of the above-mentioned circumstances, and it is an object of the present invention to obviate the problem as above and provide ultrafine alloy particles whose particle surfaces are substantially made of metals, yet without coalescence and being highly inhibitory to oxidation, and a process for producing the same.

More particularly, it is an object of the present invention to provide ultrafine alloy particles comprising an alloy of a primary metal and an auxiliary component (that is, a subsidiary metal), having no coalescence and highly suppressing oxidation thereof as described above, and a process for producing the same.

In view of necessity of developing the ultrafine alloy particles expected to have high surface activity and novel functionality as above and establishing a process for stably and efficiently producing such the ultrafine alloy particles, the inventors of the present invention have made extensive research to attain the above-mentioned objects. As a result, the inventors of the present invention have found that the ultrafine alloy particles having no adhesiveness and suppressing oxidation thereof can be produced by introducing material for producing the ultrafine alloy particles, the material being able to form an alloy, into a thermal plasma flame to form a vapor-phase mixture and then supplying a cooling gas toward an end portion of the thermal plasma flame in a sufficient amount for quenching the vapor-phase mixture, thus having completed the present invention.

That is, a first aspect of the present invention provides ultrafine alloy particles comprising an alloy including: a primary metal; and one or more subsidiary metals solid-soluble in the primary metal, wherein a content of the one or more subsidiary metals is in a range of 1 wt % to 25 wt %; and the one or more subsidiary metals solid-solved in the primary metal inhibit coalescence or oxidation, or both, of the ultrafine alloy particles including the primary metal.

Here, it is preferable that a vapor pressure ratio between the primary metal and each of the one or more subsidiary metals at a highest temperature among melting points of the primary metal and the one or more subsidiary metals be in a range of $1:10^4$ to $1:10^{-4}$.

And, it is preferable that the primary metal be silver, and the one or more subsidiary metals be one selected from a group consisting of palladium, tin, nickel, copper, gold and platinum.

It is also preferable that the primary metal be copper, and the one or more subsidiary metals be nickel.

It is also preferable that the primary metal be selected from a group consisting of iron, cobalt and nickel, and the one or more subsidiary metals be aluminum.

In the meantime, a second aspect of the present invention provides a process for producing ultrafine alloy particles comprising an alloy including a primary metal and one or more subsidiary metals, comprising steps of: introducing powder materials for producing the ultrafine alloy particles into a thermal plasma flame under reduced pressure to form a vapor-phase mixture, the powder materials including the primary metal and the one or more subsidiary metals solid-soluble in the primary metal and a content of the one or more subsidiary metals being in a range of 1 wt % to 25 wt %; and introducing a cooling gas toward an end portion of the thermal plasma flame in a supply amount sufficient for quenching the vapor-phase mixture so as to generate the ultrafine alloy particles capable of inhibiting coalescence or oxidation, or both, of the ultrafine alloy particles including the primary metal.

Here, it is preferable that a vapor pressure ratio between the primary metal and each of the one or more subsidiary metals at a highest temperature among melting points of the primary metal and the one or more subsidiary metals be in a range of $1:10^4$ to $1:10^{-4}$ ($10^{-4}:1$ to $10^4:1$).

It is preferable that the primary metal be silver, and the one or more subsidiary metals be one selected from a group consisting of palladium, tin, nickel, copper, gold and platinum.

It is also preferable that the primary metal be copper, and the one or more subsidiary metals be nickel.

And, it is preferable that the primary metal be selected from a group consisting of iron, cobalt and nickel, and the one or more subsidiary metals be aluminum.

The particle size of the ultrafine alloy particles discussed in the present invention can be of particle diameters on the order of few nanometers to several tens nanometers, that is, the sizes of ultrafine particles, so-called nano particles.

Note that in the process for producing ultrafine alloy particles according to the present invention, the supply amount of the cooling gas sufficient for quenching the vapor-phase mixture is defined as described below. That is, the supply amount of the cooling gas is preferably set such that the cooling gas introduced into a cooling chamber comprising a space for quenching the vapor-phase mixture has an average flow rate in the cooling chamber (i.e., intra-chamber flow rate) of 0.001 to 60 m/sec. More preferably, the supply amount of the cooling gas is such that the average flow rate becomes 0.01 to 10 m/sec.

Further, the direction in which the gas is introduced into the cooling chamber is preferably such that: when the vertically upward direction is assumed to give an angle of 0° to a tail (i.e., an end portion) of the thermal plasma flame located in the chamber, the direction in which the gas is introduced into the cooling chamber forms an angle α within the range of 90°<α<240° (more preferably, 100°<α<180°) to the tail; and when the direction as seen from a gas ejection nozzle toward the thermal plasma flame is assumed to give an angle of 0° to the tail, the direction in which the gas is introduced into the cooling chamber forms an angle β within the range of −90°<β<90° (more preferably, −45°<β<45°) to the thermal plasma flame.

The present invention has remarkable effects. In other words, according to the present invention, ultrafine alloy particles comprising an alloy including subsidiary components, the particles exhibiting no coalescence and high inhibition of oxidation, and a process for producing the same can be obtained.

More specifically, according to the present invention, by introducing materials for producing ultrafine alloy particles into a thermal plasma flame under reduced pressure to form a vapor-phase mixture, the materials including a primary metal, e.g., a primary metal A, and one or more subsidiary metals solid-soluble in the primary metal, that is to say, having solid solubility with the primary metal, e.g., one or more metals selected from a plurality of metals B, C and so forth solid-soluble in the primary metal A, in which the one or more subsidiary metals are contained in a range of 1 wt % to 25 wt %, and introducing a cooling gas toward the end portion (tail) of the thermal plasma flame in a sufficient amount for quenching the vapor-phase mixture, ultrafine alloy particles comprising an alloy of the primary metal and the one or more subsidiary metals are produced. As a result, the present invention provides a remarkable effect of realizing unltrafine alloy particles having no coalescence and exhibiting high inhibition of oxidation.

DETAILED DESCRIPTION OF THE INVENTION

Figure 1:
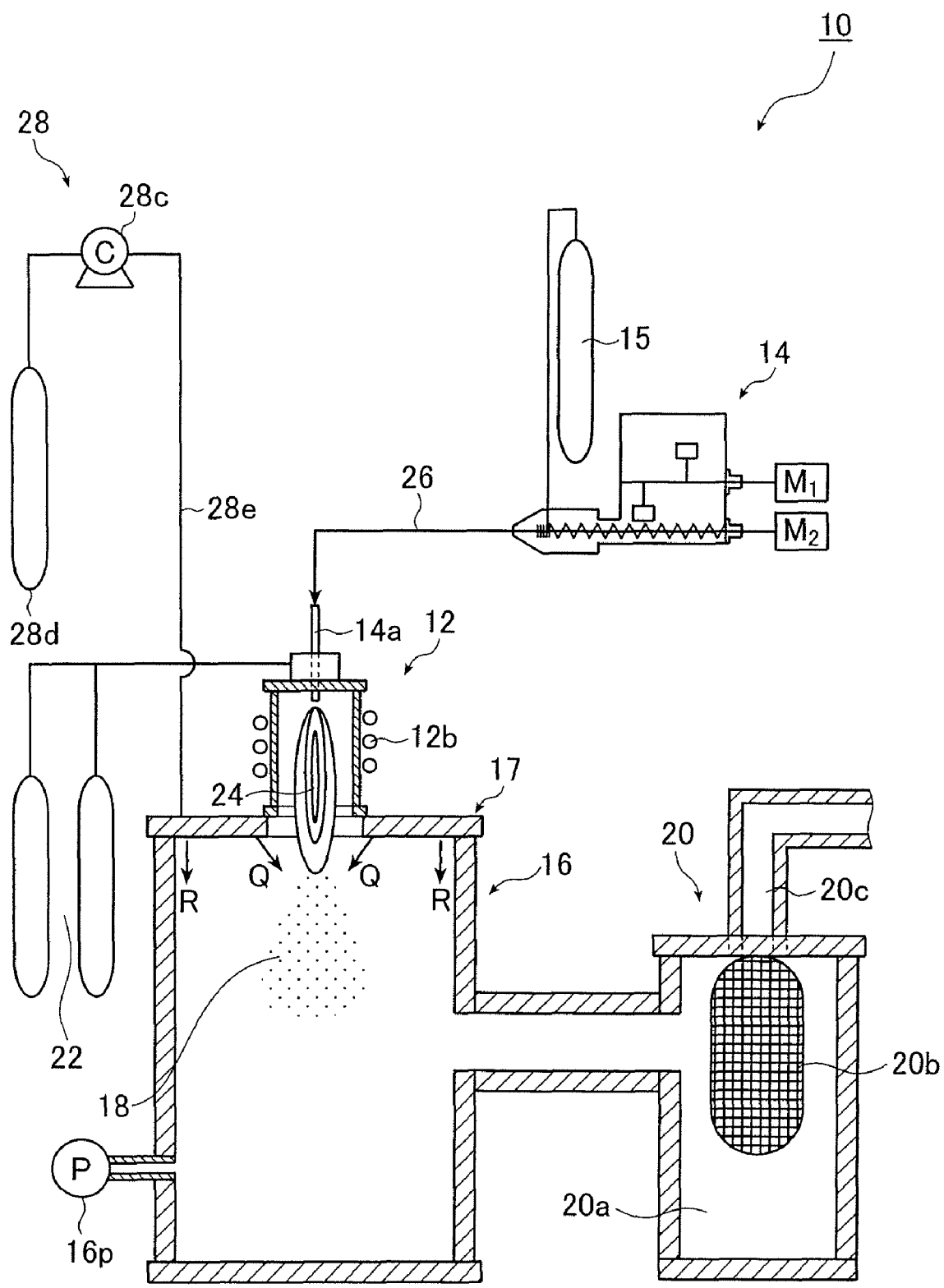
FIG. 1 is a schematic cross-sectional diagram showing the whole construction of an ultrafine alloy particle producing apparatus in an embodiment for practicing a process for producing ultrafine alloy particles according to an embodiment of the present invention.

Hereinafter, the ultrafine alloy particles and the process for producing ultrafine alloy particles according to the present invention will be described in detail based on preferred embodiments shown in the drawings.

Figure 2:
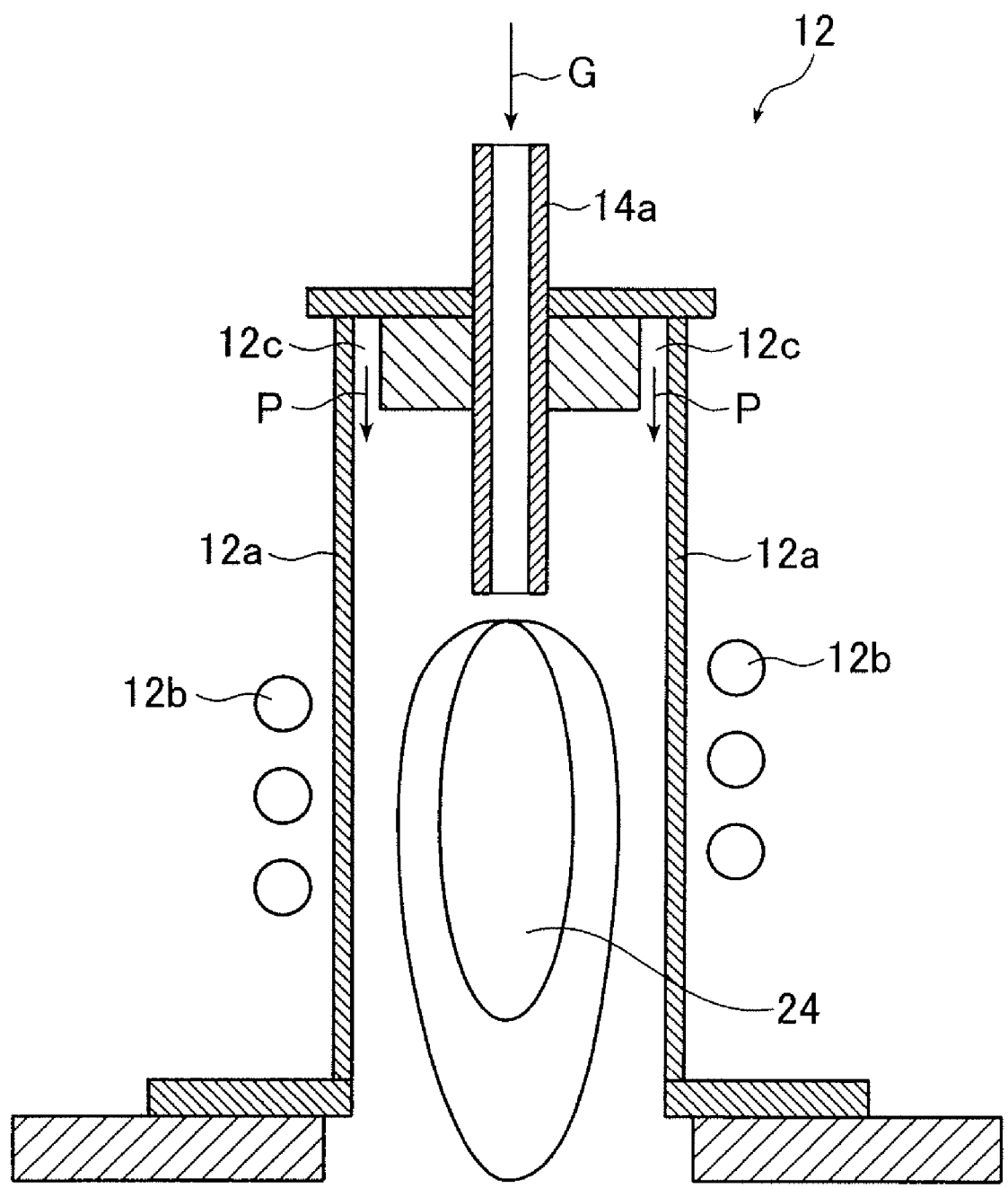
FIG. 2 is an enlarged cross-sectional view of a part near a plasma torch of the ultrafine alloy particle producing apparatus shown in FIG. 1.
Figure 3:
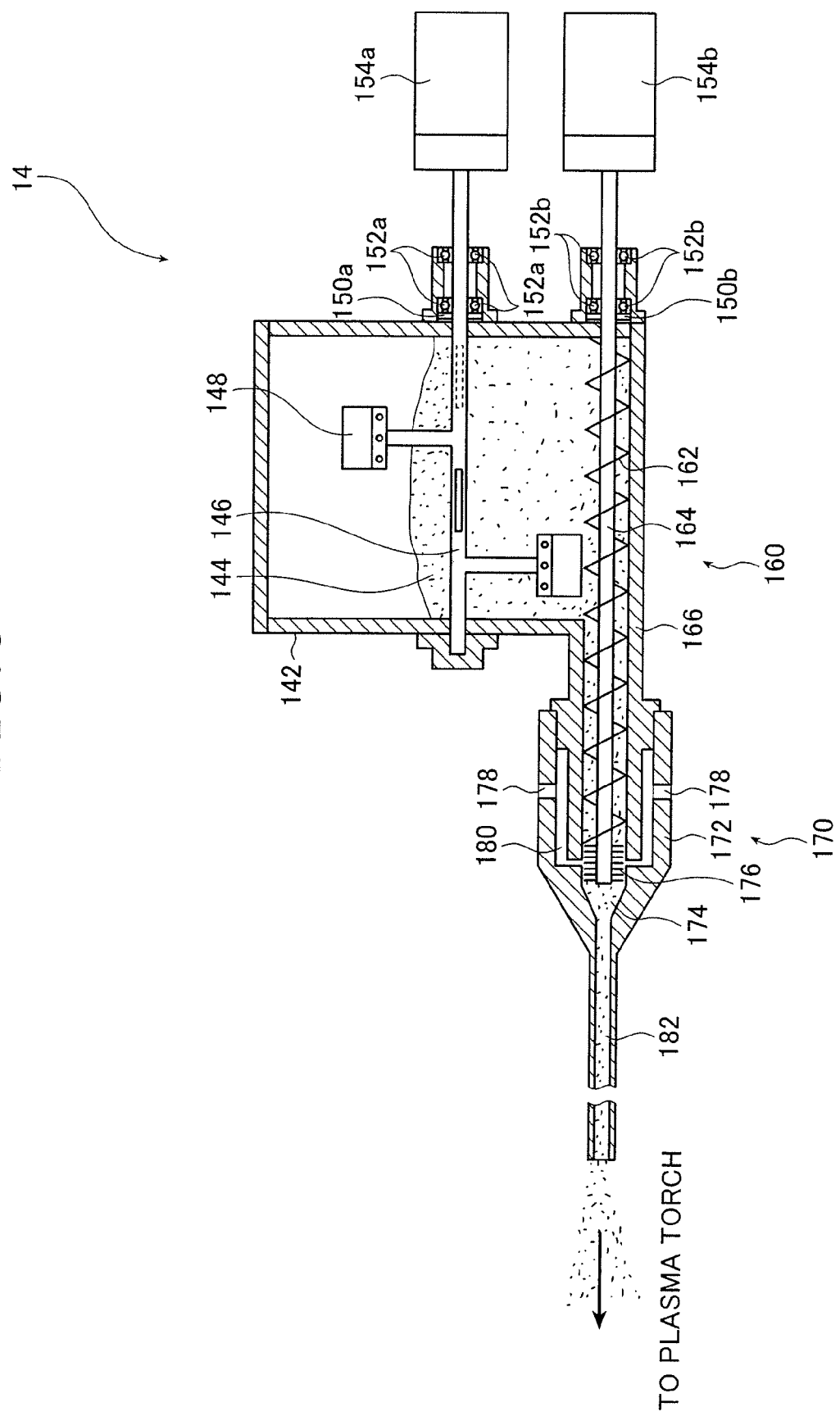
FIG. 3 is a cross-sectional view schematically showing a construction of a powder material supplying apparatus of the ultrafine alloy particle producing apparatus shown in FIG. 1.
Figure 4:
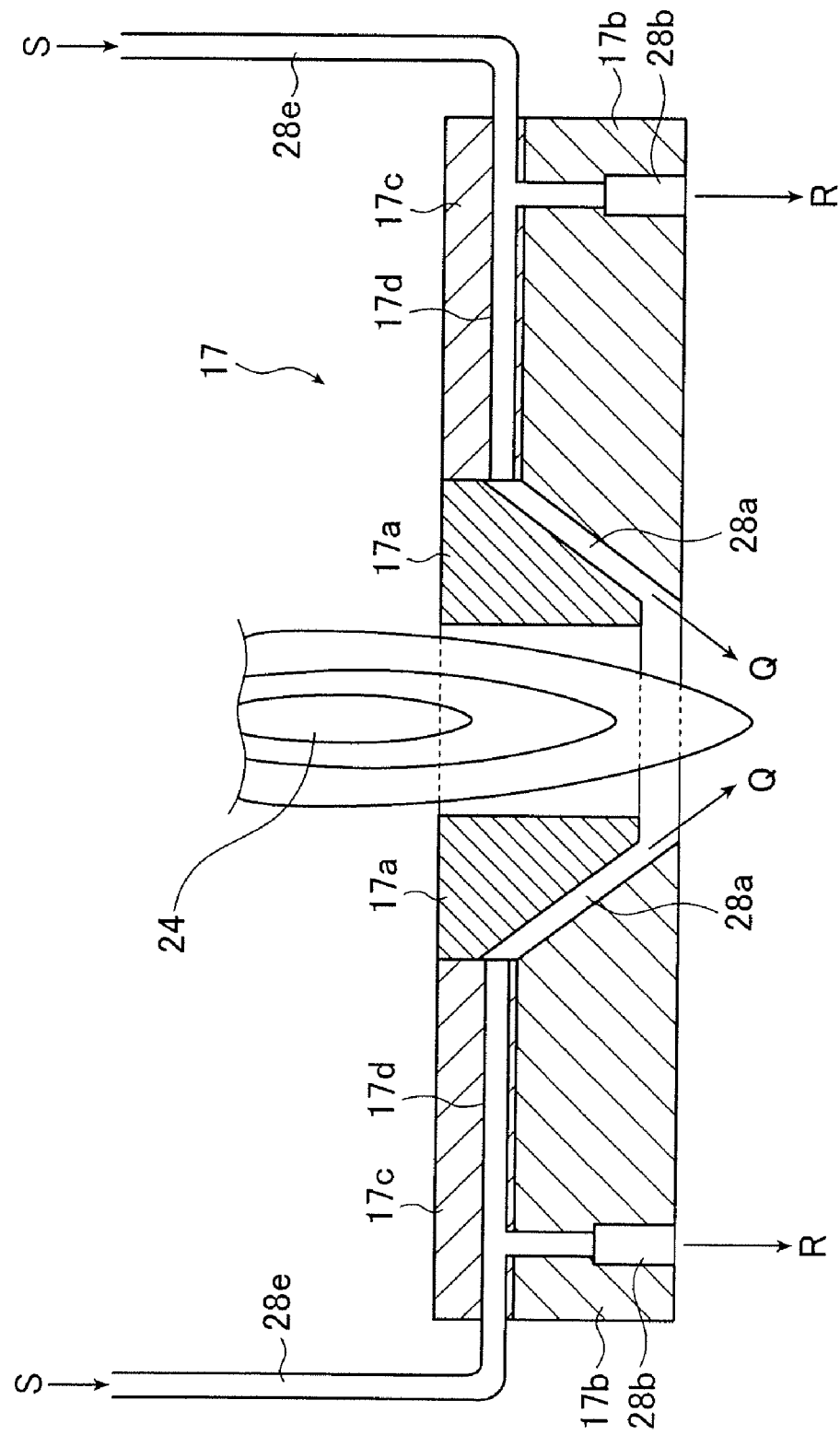
FIG. 4 is an enlarged cross-sectional view showing a top panel of a chamber of the ultrafine alloy particle producing apparatus shown in FIG. 1 and a part near gas ejection nozzles provided in the top panel.

FIG. 1 is a schematic diagram showing the whole construction of an ultrafine alloy particle producing apparatus 10 for practicing a process for producing ultrafine alloy particles according to an embodiment of the present invention. FIG. 2 is a partially enlarged diagram showing a part near a plasma torch 12 shown in FIG. 1. FIG. 3 is an enlarged diagram showing a material supplying apparatus 14 shown in FIG. 1. FIG. 4 is an enlarged cross-sectional view showing a top panel 17 of a chamber 16 shown in FIG. 1 and the part near a gas ejection nozzle 28a and a gas ejection nozzle 28b each provided in the top panel 17.

The ultrafine alloy particle producing apparatus 10 shown in FIG. 1 is for producing the ultrafine alloy particles according to the present invention and includes a plasma torch 12 for generating a thermal plasma flame, a material supplying apparatus 14 for supplying a raw material for producing ultrafine alloy particles (hereinafter referred to as "powder material") 14 into the plasma torch 12, a chamber 16 having a function as a cooling chamber for generating ultrafine alloy particles 18, a collecting section 20 for collecting the generated ultrafine alloy particles 18, and a gas introduction apparatus 28 for introducing a cooling gas into the chamber 16 and ejecting the gas toward a thermal plasma flame 24.

The plasma torch 12 shown in FIG. 2 includes a quartz tube 12a and a coil 12b for high frequency oscillation, which surrounds the outside of the quartz tube. In an upper part of the plasma torch 12, an introduction tube 14a described below for introducing the material for producing ultrafine alloy particles and the carrier gas into the plasma torch 12 is provided in the center thereof, and a plasma gas introduction port 12c is formed in the periphery thereof (i.e., on the same circle).

The plasma gas is sent from a plasma gas source 22 to the plasma gas introduction port 12c. Examples of the plasma gas include argon, nitrogen, and hydrogen. In the plasma gas source 22, for example, two kinds of plasma gases are provided. The plasma gas is sent from the plasma gas source 22 into the plasma torch 12 through the plasma gas introduction port 12c in the form of a ring as shown by an arrow P. Then, high frequency current is applied to the coil 12b for high frequency oscillation to generate the thermal plasma flame 24.

Note that the outside of the quartz tube 12a is surrounded by a tube (not shown) formed concentrically, and cooling water is circulated in a space between this tube and the quartz tube 12a to cool the quartz tube 12a in order to prevent the quartz tube 12a from reaching too high a temperature due to the thermal plasma flame 24 generated in the plasma torch 12.

The material supplying apparatus 14, as shown on an enlarged scale in FIG. 3, includes as main components a storage tank 142 for storing the powder material in which two or more metal materials are mixed at a predetermined ratio, a screw feeder 160 for transporting a specified amount of the powder material of the mixture, and a dispersing section 170 for dispersing the powder material transported by the screw feeder 160 into a state of primary particles before the particles are finally spread.

The storage tank 142 is provided with exhaust piping and air inlet piping (not shown). The storage tank 142 is a pressure vessel sealed with oil seal or the like, and is constructed so that the atmosphere therein can be controlled. Further, in the upper part of the storage tank 142, an introduction port (not shown) for introducing the powder material is provided, and the powder material 144 is charged into the storage tank 142 through the introduction port and stored therein.

Note that an embodiment in which the powder material made from two or more metal materials preliminarily mixed at a predetermined ratio is introduced into the storage tank 142 and stored therein is described above, but this is just an example. Two or more metal materials, of course, may be each stored in separate storing chambers (not shown) and be mixed at a predetermined ratio at the time of introduction into the storage tank 142.

In the storage tank 142, an agitation shaft 146 and an agitation vane 148 connected thereto are provided in order to prevent agglomeration of the powder material 144 stored in the tank 142. The agitation shaft 146 is provided rotatably in the storage tank 142 by means of an oil seal 150a and a bearing 152a.

Further, an end of the agitation shaft 146 positioned outside the storage tank 142 is connected to a motor 154a, and its rotation is controlled by a controlling apparatus (not shown).

In a lower part of the storage tank 142, there is provided the screw feeder 160 for enabling transportation of the powder material 144 in a specified amount. The screw feeder 160 includes a screw 162, a shaft 164 of the screw 162, a casing 166, and a motor 154b which is a source of rotation power for the screw 162. The screw 162 and the shaft 164 are provided in the lower part of the storage tank 142 so as to run across the storage tank. The shaft 164 is provided rotatably in the storage tank 142 through an oil seal 150b and a bearing 152b.

Further, an end of the shaft 164 positioned outside the storage tank 142 is connected to a motor 154b and its rotation is controlled by a controlling apparatus (not shown). Further, an opening in the lower part of the storage tank 142 and the dispersing section 170 described later are connected with each other by a casing 166 which forms a cylindrical passage that accommodates the screw 162. The casing 166 extends in the midway of the inside of the dispersing section 170 described later.

As shown in FIG. 3, the dispersing section 170 has an outer tube 172 fitted onto a part of the casing 166 and secured thereto and a rotary brush 176 whose bristles are set in a front edge of the shaft 164, so the powder material 144 transported in a specified amount by the screw feeder 160 can be dispersed primarily.

The end of the outer tube 172 opposite with that fitted onto the casing 166 and secured thereto is frusto-conical in shape, and constitutes a powder dispersing chamber 174 whose interior is also frusto-conical. Further, this end is connected with a transporting tube 182 for transporting the powder material dispersed in the dispersing section 170.

The front edge of the casing 166 is opened and the shaft 164 extends beyond the opening to the powder dispersing chamber 174 inside the outer tube 172, and the rotary brush 176 is provided on the front edge of the shaft 164. A side wall of the outer tube 172 is provided with carrier gas supply ports 178, and a space defined by an outer wall of the casing 166 and an inner wall of the outer tube 172 functions as a carrier gas passage 180 through which the introduced carrier gas passes.

The rotary brush 176 is an assembly of needle-like members made of a relatively flexible material such as nylon, or a hard material such as a steel wire. The needle-like members, namely bristles, are arranged densely so as to extend radially outwardly of the shaft 164 along the inside of the casing 166 from near the front edge thereof to the inside of the powder dispersing chamber 174. The length of a needle-like member is such that the tip of the needle-like member abuts the inner wall of the casing 166.

In the dispersing section 170, a gas for dispersion and transportation is ejected from a carrier gas source 15 through the carrier gas supply ports 178 and the carrier gas passage 180 to the rotary brush 176 from the outside of the rotary brush 176 in the radial direction. As a result, the powder material 144 transported in a specified amount is dispersed into primary particles by passing through the needle-like members of the rotary brush 176.

Here, the powder dispersing chamber 174 is formed such that the angle between the generatrix of the frusto-conical powder dispersing chamber 174 and the shaft 164 is about 30°. An inner volume of the powder dispersing chamber 174 is preferably small. If the inner volume of the powder dispersing chamber is large, the powder material 144 dispersed by the rotary brush 176 adheres to the inner wall of the powder dispersing chamber before the powder material 144 enters the transporting tube 182, which is then scattered again, thus causing a problem in that the density of the dispersed powder to be supplied is not made uniform.

The transporting tube 182 is connected to the outer tube 172 at one end thereof and to the plasma torch 12 at the other end. Further, the transporting tube 182 has a length ten or more times as large as the diameter thereof and is preferably provided at least in the midway with a portion having a diameter which allows the gas stream containing the dispersed powder to flow in a flow rate of 20 m/sec or more. This can prevent agglomeration of the powder material 144 that has been dispersed into a state of primary particles in the dispersing section 170, and allows the powder material 144 to be spread in the plasma torch 12 while keeping the above-mentioned dispersion state.

The carrier gas under extrusion pressure is supplied from the carrier gas source 15 together with the powder material 144 through the introduction tube 14a into the thermal plasma flame 24 in the plasma torch 12 as indicated by an arrow G shown in FIG. 2. The introduction tube 14a has a nozzle mechanism for spraying the powder material into the thermal plasma flame 24 in the plasma torch 12, and the powder material 144 is sprayed into the thermal plasma flame 24 in the plasma torch 12 through the nozzle mechanism. As the carrier gas, argon, nitrogen, hydrogen, and the like can be used alone or in combination as appropriate.

On the other hand, as shown in FIG. 1, the chamber 16 is provided below and adjacent to the plasma torch 12. The powder material 144 sprayed into the thermal plasma flame 24 in the plasma torch 12 is evaporated to form a vapor-phase mixture, and immediately thereafter, the vapor-phase mixture is quenched in the chamber 16 to generate ultrafine alloy particles 18. That is, the chamber 16 has both functions of a cooling chamber and a reaction chamber.

By the way, the ultrafine alloy particle producing apparatus to be used to produce ultrafine alloy particles of the present invention is characterized by being provided with a gas introduction apparatus mainly provided for quenching the vapor-phase mixture. Hereinafter, the gas introduction apparatus is explained.

The gas introduction apparatus 28 shown in FIGS. 1 and 4 includes a compressor 28c for applying extrusion pressure to a gas to be introduced into the chamber 16, a gas source 28d of the gas to be introduced into the chamber 16, and a pipe 28e connecting the compressor and the gas source with the top panel 17 of the chamber 16.

Here, the gas source 28d stores argon as an example of a cooling gas. In addition to argon, such gases as nitrogen, hydrogen, oxygen, air, carbon dioxide, water vapor, and a mixture thereof can be used as the cooling gas.

Further, the gas introduction apparatus 28 has, in the top panel 17, a gas ejection nozzle 28a for ejecting a gas (here, as an example, argon as the cooling gas) at the predetermined angle as described above toward the tail of the thermal plasma flame 24 and a gas ejection nozzle 28b for ejecting the gas (argon) from above to below along the inner side wall of the chamber 16 in order to prevent the ultrafine alloy particles 18 generated in the chamber 16 from adhering to the inside of the chamber 16.

Here, the tail of the thermal plasma flame refers to an edge of the thermal plasma flame on the side opposite with the plasma gas introduction port 12c, that is, an end portion of the thermal plasma flame.

As shown in FIG. 4, the gas ejection nozzles 28a and 28b are formed in the top panel 17 of the chamber 16. The top panel 17 includes an inner top panel part 17a having a frusto-conical shape with an upper portion thereof being a cylinder, a lower top panel part 17b having a frusto-conical hole, and an upper outer top panel part 17c having a moving mechanism for vertically moving the inner top panel part 17a.

Here, a portion in which the inner top panel part 17a and the upper outer top panel part 17c come into contact with each other (i.e., the cylinder portion in the upper portion of the inner top panel part 17a) is threaded, so the position of the inner top panel part 17a can be changed in the vertical direction by rotating the inner top panel part 17a, and the inner top panel part 17a can be adjusted for its distance from the lower top panel part 17b. Further, a slope of the conical portion of the inner top panel part 17a is the same as a slope of the conical portion of the hole of the lower top panel part 17b, which means that they are constructed such that they can be combined with each other.

Further, the gas ejection nozzle 28a is a gap, that is, a slit formed between the inner top panel part 17a and the lower top panel part 17b. The width of the slit is adjustable as described above and the slit is formed circumferentially and concentric with the top panel. Here, the gas ejection nozzle 28a may be of any form as far as it can eject the gas (here, argon) toward the tail of the thermal plasma flame 24, so the gas ejection nozzle 28a is not limited to the slit form as described above and may be in the form of, for example, a plurality of holes arranged circumferentially.

The interior of the upper outer top panel part 17c is provided with an aeration passage 17d for passing the gas (argon) to be sent through the pipe 28e. A part of the gas (argon) to be sent through the pipe 28e passes through the aeration passage 17d and reaches the gas ejection nozzle 28a which is a slit formed between the inner top panel part 17a and the lower top panel part 17b as described above. And, the rest of the gas passes through the aeration passage 17d and reaches the gas ejection nozzle 28b which is also a slit.

The gas (argon) to be sent to the gas ejection nozzle 28a advances in the directions shown by arrows S in FIG. 4, passes through the aeration passage 17d, and is ejected in the directions indicated by arrows Q in FIGS. 1 and 4, that is, toward the tail (i.e., end portion) of the thermal plasma flame in the predetermined supply amount and at the predetermined angle as described above. The gas (argon) to be sent to the gas ejection nozzle 28b advances also in the directions shown by arrows S in FIG. 4, passes through the aeration passage 17d but diverges in the midway, and is ejected in the directions indicated by arrows R in FIGS. 1 and 4 so that the generated ultrafine alloy particles 18 can be supplied such that they are prevented from being adhered onto the inner wall of the chamber 16.

Here, the predetermined supply amount of the gas (argon) is explained. As described above, the supply amount sufficient for quenching the vapor-phase mixture is preferably an amount in which, in the chamber 16 formed for providing a space necessary for quenching the vapor-phase mixture, the gas to be introduced thereinto has an average flow rate in the chamber 16 (i.e., flow rate in the chamber) of 0.001 to 60 m/sec, or more preferably 0.01 to 10 m/sec. Such a range of the average flow rate is a gas supply amount sufficient for quenching the vapor-phase mixture obtained by evaporating powder material or the like sprayed into the thermal plasma flame 24 to generate ultrafine alloy particles, and for preventing agglomeration of the resultant ultrafine alloy particles due to collisions thereof.

Note that this supply amount is required to be an amount sufficient for quenching the vapor-phase mixture to condense/solidify it, and also an amount sufficient for diluting the vapor-phase mixture so that they do not cohere and coagulate or condense/solidify as a result of collision of ultrafine alloy particles immediately after their generation. A value of the supply amount may be determined appropriately depending on the shape and size of the chamber 16.

However, it is preferable that the supply amount be controlled so as not to inhibit the stabilization of the thermal plasma flame.

Figure 5A:
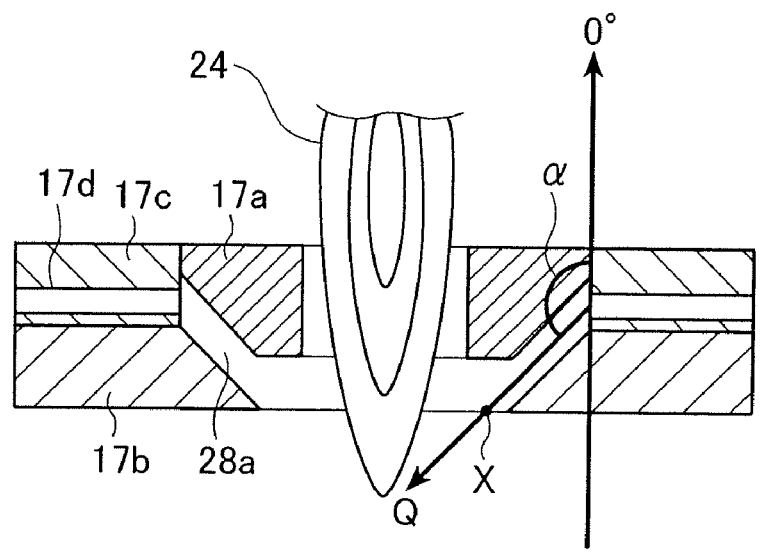
FIGS. 5A and 5B are diagrams each illustrating an angle of a gas ejected from the gas ejection nozzle shown in FIG. 4, with FIG. 5A showing a cross section in a vertical direction through the central axis of the top panel of the chamber, and FIG. 5B being a bottom view of the top panel.
Figure 5B:
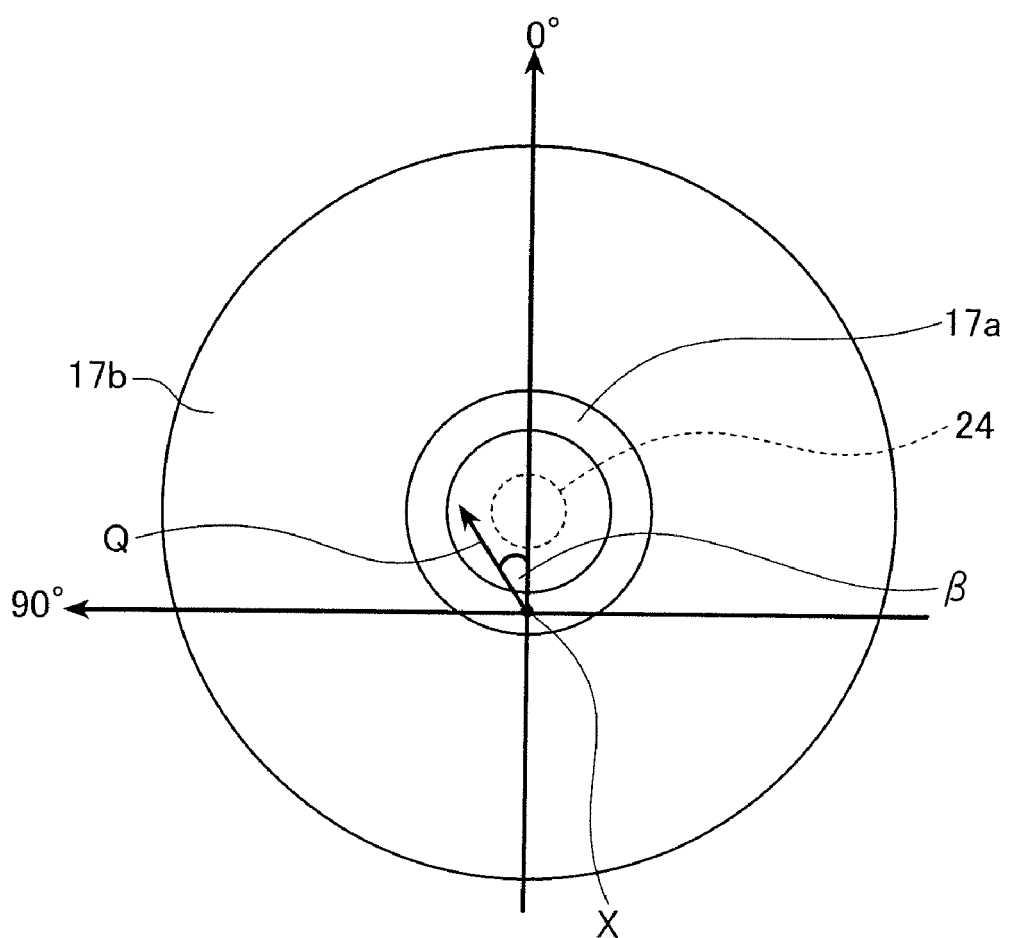

Next, referring to FIGS. 5A and 5B, the predetermined angle in the case where the gas ejection nozzle 28a is in the form of a slit is explained. FIG. 5A is a cross-sectional view in a vertical direction through a central axis of the top panel 17 of the chamber 16. Also, FIG. 5B is a bottom view of the top panel 17. Note that in FIG. 5B, a view taken along a direction perpendicular to the direction in which the cross-section shown in FIG. 5A is viewed is indicated. Here, the point X in each of FIGS. 5A and 5B is an ejection point at which the gas sent from the gas source 28d (cf. FIG. 1) through the aeration passage 17d is ejected into the inside of the chamber 16 from the gas ejection nozzle 28a. The gas ejection nozzle 28a is actually a circular slit, so the gas upon ejection forms a gas stream in the form of a band. Therefore, the point X is an imaginary point of ejection.

As shown in FIG. 5A, when the center of the opening of the aeration passage 17d is a point of origin, the upright direction is 0°, the counterclockwise direction on paper is defined as a positive direction, and an angle at which a gas is ejected from the gas ejection nozzle 28a in the direction indicated by an arrow Q is defined as an angle α. The angle α is an angle between the direction in which a gas is ejected and the direction from the head (i.e., start portion) to the tail (i.e., end portion) of the thermal plasma flame (usually vertical direction).

Further, as shown in FIG. 5B, when the above-mentioned imaginary ejection point X is a point of origin, the direction from the ejection point X toward the center of the thermal plasma flame 24 is 0°, the counterclockwise direction on paper is defined as a positive direction, and an angle of the direction in which the gas is ejected from the gas ejection nozzle 28a as indicated by an arrow Q in a direction of a plane perpendicular to the direction from the head (i.e., start portion) to the tail (i.e., end portion) of the thermal plasma flame 24 is defined as an angle β. The angle β is an angle relative to the central portion of the thermal plasma flame in a plane perpendicular to the direction from the head (i.e., start portion) to the tail (i.e., end portion) of the thermal plasma flame (usually in a horizontal plane).

Using the above-mentioned angle α (usually an angle in the vertical direction) and the angle β (usually an angle in the horizontal direction), the predetermined angle, that is, the direction of introduction of the gas into the chamber is set such that in the chamber 16, the angle α is preferably in the range of $90°<α<240°$, more preferably in the range of $100°<α<180°$, and most preferably $α=135°$ with respect to the tail (i.e., end portion) of the thermal plasma flame 24, and the angle β is preferably in the range of $-90°<β<90°$, more preferably in the range of $-45°<β<45°$, and most preferably $β=0°$.

As described above, by the gas ejected in the predetermined amount and at the predetermined angle toward the thermal plasma flame 24, the vapor-phase mixture is quenched to generate ultrafine alloy particles 18. The gas ejected into the chamber 16 at the predetermined angle as described above does not always reach the tail of the thermal plasma flame 24 at the angle at which the gas is ejected due to the influence of turbulent flow or the like generated in the chamber 16. However, it is preferable to set the angle of ejecting the gas to the above-mentioned angle in order to effectively cool the vapor-phase mixture, stabilize the thermal plasma flame 24, and efficiently operate the ultrafine alloy particle producing apparatus 10. Note that the above-mentioned angle can be determined experimentally while taking into consideration conditions such as the size of the apparatus and size of the thermal plasma flame.

On the other hand, the gas ejection nozzle 28b is a slit formed in the lower top panel part 17b. The gas ejection nozzle 28b is to introduce the gas into the chamber 16 in order to prevent the generated ultrafine alloy particles 18 from adhering to the inner wall of the chamber 16.

The gas ejection nozzle 28b is a slit circumferentially formed and concentric with the top panel 17. However, the gas ejection nozzle does not have to be a slit as far as it has a shape that can sufficiently achieve the above-mentioned purpose.

Here, the gas introduced into the top panel 17 (more specifically, lower top panel part 17b) from the gas source 28d via the pipe 28e passes through the aeration passage 17d and is ejected from the gas ejection nozzle 28b along the inner wall of the chamber 16 from above to below in directions indicated by arrows R shown in FIGS. 1 and 4.

This operation gives rise to the effect of preventing the ultrafine alloy particles from adhering to the inner wall of the chamber 16 in the process of collecting the ultrafine alloy particles. The amount of the gas to be ejected from the gas ejection nozzle 28b does not have to be an unnecessarily large amount as far as the amount is sufficient for achieving this purpose and may be an amount sufficient for preventing the ultrafine alloy particles from adhering to the inner wall of the chamber 16.

Note that a pressure gauge 16p provided on the side wall of the chamber 16 shown in FIG. 1 is to monitor the pressure in the chamber 16 and is mainly used to detect a change in the amount of gas supplied into the chamber 16 as described above, and is also used to control the pressure in the system.

As shown in FIG. 1, on a side of the chamber 16, a collecting section 20 for collecting the generated ultrafine alloy particles 18 is provided. The collecting section 20 includes a collecting chamber 20a, a filter 20b provided in the collecting chamber 20a, and a vacuum pump (not shown) connected through a pipe 20c provided in an upper part of the collecting chamber 20a. The generated ultrafine alloy particles are sucked into the collecting chamber 20a by being sucked by the vacuum pump, and remain on the surface of the filter 20b and are then collected.

Then, while stating the operation of the ultrafine alloy particle producing apparatus 10, the process for producing ultrafine alloy particles according to one embodiment of the present invention using the ultrafine alloy particle producing apparatus 10, and the ultrafine alloy particles generated by the production process will be explained.

In the process for producing ultrafine alloy particles according to this embodiment, first, a powder material which is a material for producing ultrafine alloy particles (here, assumed as two or more metals capable of forming an alloy are included) is charged in the material supplying apparatus 14 at a predetermined ratio.

Here, preferably, the particle size of the powder material to be used is, for example, 10 μm or less.

Here, the powder material preferably used to form an alloy has to include two or more metals that can be evaporated by the thermal plasma flame, the two or more metals comprising a primary metal (main component) and one or more subsidiary metals (one or more auxiliary components). At the same time, it is essential that the two or more metals are solid-soluble or have solid solubility and are mixed at a predetermined ratio. In addition, differences among their vapor pressures preferably remain within a predetermined range.

Particularly, the powder material for producing the ultrafine particles used in the present invention has to include two or more metals comprising a primary metal and one or more subsidiary metals solid-soluble in the primary metal to form ultrafine alloy particles of the present invention. The content of the one or more subsidiary metals in the powder material needs to be 1 wt % to 25 wt %. The subsidiary metals, forming the ultrafine alloy particles with the primary metal, should impart function of coalescence-inhibition or oxidation-inhibition, or both, to the ultrafine alloy particles and allow the ultrafine alloy particles to exercise such the function.

In other words, the present invention requires the subsidiary metals (auxiliary components) to be solid-soluble in or have solid solubility with the primary metal and to impart function of coalescence-inhibition or oxidation-inhibition, or both, to the resulting ultrafine alloy particles, and, as long as satisfying these conditions, the metal materials to form the ultrafine alloy particles are not particularly limited and can be selected depending on the intended use.

In the present invention, it is preferable that a vapor pressure ratio between the primary metal and each of the one or more subsidiary metals of the two or more metals at a highest temperature among melting points of two or more metals, that is, the primary metal and the one or more subsidiary metals be in a range of $1:10^4$ to $1:10^{-4}$ ($10^{-4}:1$ to $10^4:1$).

Regarding the vapor pressure ratio (between dissimilar metals), it is important to compare vapor pressures, for example, of two different metals, that is, a primary metal and a subsidiary metal, having different vapor pressures at a temperature of the higher melting point between the two different metals (or, in general, at a temperature of the highest melting point among a plurality of metals).

Here, the comparison is made at a temperature of the higher melting point between the two metals as an example (in general, at a temperature of the highest melting point among a plurality of metals) because at or above the temperature, all the metals are in the form of liquid or gas and are likely to undergo liquid-phase reaction or vapor-phase reaction to form an alloy, while at a temperature therebelow, at least one of the metals is solidified, precluding the metals from forming an alloy. Hence, vapor pressures at a temperature where the metals are allowed to form an alloy should be compared to present an indicator for alloyability.

In the present invention, a vapor pressure ratio between the primary metal and each of the one or more subsidiary metals at a highest temperature among melting points of the two or more metals is set in a range of $1:10^4$ to $1:10^{-4}$ ($10^{-4}:1$ to $10^4:1$), because otherwise the metals would hardly form an alloy, more specifically, because a large difference in vapor pressure ratio would lead a metal of a lower vapor pressure to be separated out and solidified prior to another metal of a higher vapor pressure so that those metals would fail in forming an alloy and become separate metal particles.

A preferable powder material for producing the ultrafine alloy particles used in the present invention is as follows: given that two or more metals, that is, a primary metal as a metal A and a subsidiary metal as one or more selected from a plurality of metals B, C and so forth are used, when the primary metal (metal A) is silver, the subsidiary metal (one or more selected from a plurality of metals B, C, and so forth) is preferably one selected from the group consisting of palladium, tin, copper, nickel, gold and platinum.

When the primary metal is copper, the subsidiary metal is preferably nickel.

When the primary metal is one selected from a group consisting of iron, cobalt and nickel, the subsidiary metal is preferably aluminum.

Any combination of the primary metal and the subsidiary metal described above should satisfy the characteristics required for the primary metal and the subsidiary metal in the present invention.

And, as described above, a mixture ratio of the subsidiary metal in the mixed powder material comprising the primary metal and the subsidiary metal needs to be in a range of 1 wt % to 25 wt %, preferably, in a range of 2 wt % to 20 wt %.

The subsidiary metal mixed in the powder material at a ratio of less than 1 wt % would not sufficiently impart function of coalescence inhibition or oxidation inhibition to the resulting ultrafine alloy particles. And, the subsidiary metal mixed at a ratio higher than 25 wt % would impair the characteristics of the primary metal, leading to failure of the expected property or function of the ultrafine alloy particles.

Next, the materials for producing ultrafine alloy particles are subjected to gas-entrainment using a carrier gas and introduced, through the introduction pipe 14a for introducing the material into the plasma torch 12, into the thermal plasma flame 24 where the materials are evaporated to form a vapor-phase mixture. That is, the powder material is supplied to the plasma torch 12, thereby being introduced into the thermal plasma flame 24 generating in the plasma torch 12 and evaporated, and as a result, a vapor-phase mixture is formed.

Note that the powder material has to become a vapor-phase in the thermal plasma flame 24, so the temperature of the thermal plasma flame 24 must be higher than the boiling point of the powder material. On the other hand, the higher the temperature of the thermal plasma flame 24, the easier the materials become a vapor-phase, which is preferable. The temperature is not particularly limited and may be selected as appropriate depending on the materials. For example, the temperature of the thermal plasma flame 24 may be set to 6,000° C., and theoretically, the temperature can reach about 10,000° C.

Further, the pressure atmosphere in the plasma torch 12 is preferably atmospheric pressure or less. Here, the atmosphere at atmospheric pressure or less is not particularly limited and may be set to, for example, 0.5 to 100 kPa.

Then, the vapor-phase mixture obtained by evaporating the powder material in the thermal plasma flame 24 is quenched in the chamber 16 to generate ultrafine alloy particles 18. In particular, the vapor-phase mixture in the thermal plasma flame 24 is quenched with the gas ejected in the directions indicated by arrows Q toward the thermal plasma flame at a predetermined angle through the gas ejection nozzle 28a to generate the ultrafine alloy particles 18.

Typically, collisions between the ultrafine alloy particles immediately after generation as described above form agglomerates, thereby generating nonuniformity in particle size. On the contrary, in the process for producing ultrafine alloy particles according to the present invention, the gas that is ejected in the directions indicated by the arrows Q through the gas ejection nozzle 28a toward the tail (i.e., end portion) of the thermal plasma flame at a predetermined angle and in a predetermined supply amount dilutes the ultrafine alloy particles 18 to prevent collision and agglomeration between the ultrafine alloy particles.

The gas that is ejected in the directions indicated by the arrows Q through the gas ejection nozzle 28a toward the tail (i.e., end portion) of the thermal plasma flame at a predetermined angle and in a predetermined supply amount rapidly lowers the temperature in the chamber 16, and at this time, vapor, in particular, the vapor-phase mixture, of two or more metals that are capable of forming an alloy turns into solid solution of the two or more metals to generate ultrafine alloy particles.

That is, the gas ejected from the gas ejection nozzle 28a quenches the vapor-phase mixture to generate ultrafine alloy particles and further to prevent agglomeration of the generated ultrafine alloy particles, making the particles smaller and uniform in size, and preventing agglomeration and coalescence of the particles as well as oxidation thereof, which is a great characteristic of the present invention.

Incidentally, the gas ejected from the gas ejection nozzle 28a gives adverse influence on the stability of the thermal plasma flame 24 more or less. However, to run the whole apparatus continuously, it is necessary to stabilize the thermal plasma flame. For this purpose, the gas ejection nozzle 28a in the ultrafine alloy particle producing apparatus 10 according to this embodiment is formed as a circumferential slit, and controlling the width of the slit enables adjustment of the supply amount and ejection speed of the gas. This makes it possible to eject the gas uniformly in the direction toward the center of the flame. Therefore, it can be said that the gas ejection nozzle 28a has a shape desirable for stabilizing the thermal plasma flame. Further, this adjustment can be performed by changing the supply amount of the gas to be ejected.

On the other hand, a part of the introduced gas is ejected in the directions indicated by the arrows R shown in FIGS. 1 and 4 through the gas ejection nozzle 28b along the inner wall of the chamber 16 from above to below. This prevents the ultrafine alloy particles 18 from adhering to the inner wall of the chamber 16 in the process of collecting the ultrafine alloy particles, thereby increasing the yield of the generated ultrafine alloy particles. Finally, the ultrafine alloy particles generated in the chamber 16 are sucked by a vacuum pump (not shown) connected to the pipe 20c and collected on the filter 20b of the collecting section 20.

Here, in general, as the carrier gas or spray gas, there can be used air, oxygen, nitrogen, argon, hydrogen, or the like. In the case where the generated ultrafine alloy particles are ultrafine metal alloy particles, argon can be advantageously used as the carrier gas or spray gas.

The ultrafine alloy particles produced by the process according to this embodiment comprise similar components in a similar composition to those of the powder material for producing ultrafine alloy particles. That is, the ultrafine alloy particles comprise an alloy including the primary metal and the one or more subsidiary metals solid-soluble in the primary metal that are contained in the powder material for producing the ultrafine alloy particles, and the one or more subsidiary metals are contained in a range of 1 wt % to 25 wt %.

As described above, the one or more subsidiary metals solid-solved in the primary metal excises function of coalescence inhibition or oxidation inhibition, or both, in the ultrafine alloy particles comprising the primary metal.

Accordingly, the content of the subsidiary metals in the ultrafine alloy particles has to be also from 1 wt % to 25 wt %. The content is preferably from 2 wt % to 20 wt %.

This is because the subsidiary metals of less than 1 wt % in the ultrafine alloy particles would not sufficiently excise its inhibitory function against coalescence or oxidation caused in the ultrafine alloy particles due to the primary metal, and the subsidiary metals of more than 25 wt % would impair the characteristics of the primary metal, failing to achieve the expected property or function in the ultrafine alloy particles.

In addition, it is naturally preferable that in the present invention, a vapor pressure ratio between the primary metal and each of the one or more subsidiary metals at a highest temperature among melting points of the primary metal and the one or more subsidiary metals is in a range of $1:10^4$ to $1:10^{-4}$ ($10^{-4}:1$ to $10^4:1$) for the reason already described above.

The ultrafine alloy particles produced by the production process according to this embodiment have a narrow particle size distribution, that is, the ultrafine alloy particles have uniform particle size and less contamination of bulky particles. To be specific, the ultrafine alloy particles of the present invention have an average particle size of 1 to 100 nm. In particular, the size of the ultrafine alloy particles discussed in the present invention can be particle sizes on the order of few nanometers to several tens nanometers of ultrafine alloy particles, so-called nanoparticles.

The process for producing ultrafine alloy particles according to this embodiment can produce ultrafine alloy particles comprising an alloy including auxiliary components, having no coalescence and high inhibition to oxidation as long as the above-described conditions are satisfied.

As described above, the ultrafine alloy particles generated by the process for producing ultrafine alloy particles according to this embodiment have a small particle size as described above and the surface activity thereof becomes extremely high, but the ejected gas described above can prevent collisions between the ultrafine alloy particles and thus prevent agglomeration thereof. In other words, the process for producing ultrafine alloy particles according to the present invention involves quenching vapor-phase mixture to generate ultrafine alloy particles that hardly agglomerate, coalesce or oxidize, thereby achieving the original object of providing ultrafine alloy particles having no coalescence and high inhibition to oxidation.

Further, the process for producing ultrafine alloy particles according to this embodiment can exhibit cooling effects, in which a gas stream generated in the chamber 16 by a plasma gas, a carrier gas, a cooling gas, evacuation operation of the vacuum pump provided in the collecting section or the like leads the vapor-phase mixture to a place sufficiently distant from the thermal plasma flame to realize cooling. It also exhibits the effect of quenching the vapor-phase mixture with the gas that is ejected toward the tail (i.e., end portion) of the thermal plasma flame.

Note that the above-mentioned embodiments and examples show examples of the present invention. The present invention is not limited thereto and various modifications and improvements may be made without departing from the gist of the present invention.

Also note that ultrafine alloy particles produced by the process for producing ultrafine alloy particles of the present invention might include a small amount of ultrafine particles of a single metal material, since a part of the materials might occasionally fail in turning into the intended ultafine alloy particles, depending on the combination of materials or production conditions, and that inclusion of such a small amount of ultrafine particles of a single metal material rarely causes practical problems and thus will not impair the significance of the present invention. Thus, the present invention is considered to include embodiments including a small amount of ultrafine particles of a single metal material as long as the inclusion amount is kept so small as to allow the invention to attain the object and to exhibit effects of the invention.

EXAMPLES

Hereinafter, the ultrafine alloy particles and the process for producing the ultrafine alloy particles will be explained in detail with reference to examples.

Example 1

First, an example in which ultrafine alloy particles comprising an alloy of silver and palladium were produced and agglomeration and coalescence of the particles to each other were prevented is presented.

As raw materials of a material for producing the ultrafine alloy particles, a silver powder having an average particle size of 4.5 μm and a palladium powder having an average particle size of 5 μm were used. The mixture mass ratio (mixing ratio) between the silver and palladium was 87:13.

As to melting points of silver and palladium, it is known that palladium has a melting point of 1540° C., which is higher than that of silver. At the temperature of the melting point of palladium, 1540° C., a vapor pressure of silver reaches $7.14 \times 10^{-2}$ Pa while that of palladium is $6.28 \times 10^{-5}$ Pa, resulting in a vapor pressure ratio of $1:8.80 \times 10^{-4}$ ($0.880 \times 10^{-3}$) (i.e., 1137:1) on the order of $10^{-3}$ difference.

Here, argon was used as a carrier gas.

The high frequency oscillation coil 12b in the plasma torch 12 was applied with high frequency voltage of about 4 MHz and about 80 kVA, and a mixed gas of 80 liters/min of argon and 5 liters/min of hydrogen was introduced as the plasma gas from the plasma gas source 22 to generate an argon/hydrogen thermal plasma flame in the plasma torch 12. Note that, here, the reaction temperature was controlled to be about 8,000° C. and 10 liters/min of a carrier gas was supplied from the carrier gas source 15 of the material supplying apparatus 14.

Mixture of the silver powder and the palladium powder together with argon as a carrier gas was introduced into the thermal plasma flame 24 in the plasma torch 12.

To be introduced into the chamber 16 by the gas introduction apparatus 28, 150 liters/min of argon was ejected from the gas ejection nozzle 28a and 50 liters/min of argon was ejected from the gas ejection nozzle 28b. The flow rate in the chamber was 0.25 m/sec. The pressure in the chamber 16 was 50 kPa.

Figure 6:
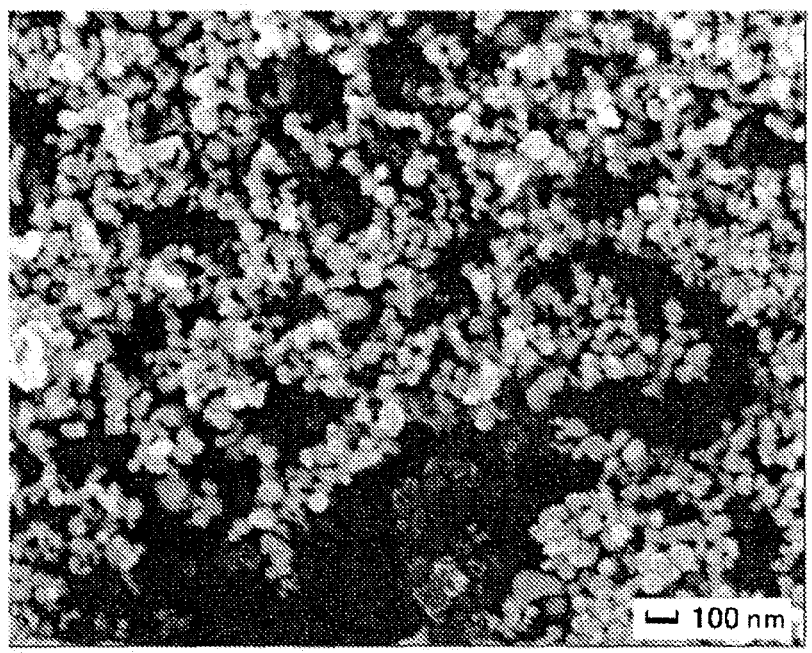
FIG. 6 is an electron micrograph of the ultrafine alloy particles obtained Example 1 (at a magnification of 50,000 times)

Ultrafine alloy particles comprising a silver-palladium alloy were generated under the above-mentioned production conditions. The particle size calculated from the specific surface area (i.e., surface area per g) of the generated ultrafine alloy particles comprising a silver-palladium alloy was 30 nm. FIG. 6 is an electron micrograph of particles generated under the above-mentioned production conditions. FIG. 6 is a photograph taken with a scanning electron microscope and observation of the surface of the ultrafine alloy particles revealed that substantially no coalescence between the particles occurred.

Note that the ultrafine alloy particles generated by the present example had an yield of 35% since the amount of the ultrafine alloy particles collected per 100 g of the charged powder material was 35 g.

Example 2

Next, an example is shown in which the ultrafine alloy particles comprising an alloy of iron and aluminum were produced, and agglomeration and coalescence of the particles to each other were prevented.

As raw materials, an iron powder having an average particle size of 3 to 5 μm and an aluminum powder having an average particle size of 5 μm were used. The mixture mass ratio (mixing ratio) between the iron and aluminum was 98:2.

As to melting points of iron and aluminum, it is known that iron has a melting point of 1550° C., which is higher than that of aluminum. At the temperature of the melting point of iron, 1550° C., a vapor pressure of iron reaches $2.67 \times 10^{-4}$ Pa while that of aluminum is $1.37 \times 10^{-6}$ Pa, resulting in a vapor pressure ratio of $1:5.13 \times 10^{-3}$ (i.e., 195:1) on the order of $10^{-2.3}$ difference.

Similarly to Example 1, argon was used as a carrier gas.

Here, the high frequency voltage to be applied to the plasma torch 12 and the supply amount of the plasma gas were the same as those used in Example 1, and an argon/hydrogen thermal plasma flame was generated in the plasma torch 12. Note that the reaction temperature was controlled to be about 8,000° C., and the supply amount of the carrier gas from the carrier gas source 15 of the material supplying apparatus 14 was set to 10 liters/min.

Mixture of the iron powder and the aluminum powder was introduced into the thermal plasma flame 24 in the plasma torch 12 together with argon as the carrier gas.

To be introduced into the chamber 16 by the gas introduction apparatus 28, 150 liters/min of argon was ejected from the gas ejection nozzle 28a and 50 liters/min of argon was ejected from the gas ejection nozzle 28b. The flow rate in the chamber was 0.25 m/sec. The pressure in the chamber 16 was 35 kPa.

Figure 7:
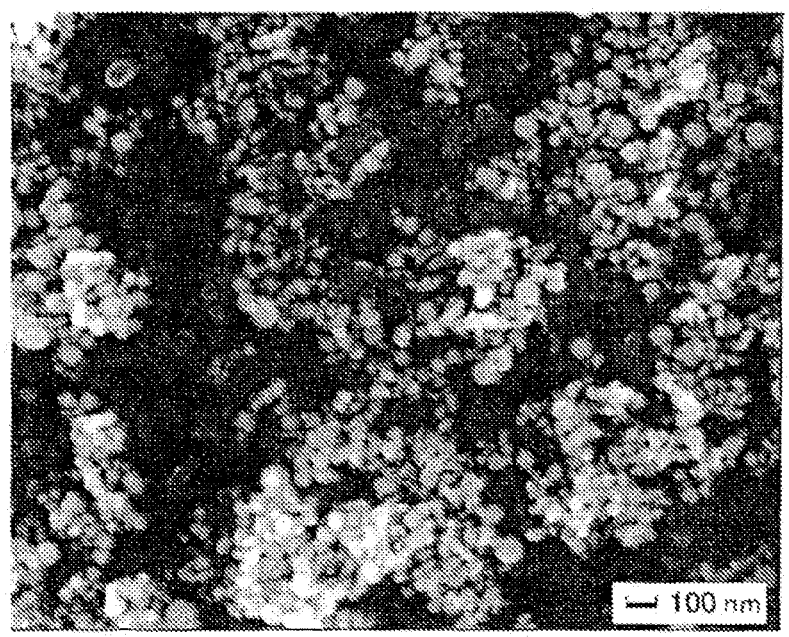
FIG. 7 is an electron micrograph of the ultrafine alloy particles obtained by Example 2 (at a magnification of 50,000 times)

Ultrafine alloy particles comprising an iron-aluminum alloy were generated under the above-mentioned production conditions. The particle diameter calculated from the specific surface area of the generated ultrafine particles comprising an iron-aluminum alloy was 25 nm. FIG. 7 shows a scanning electron micrograph of the particles.

In addition, the resulting ultrafine alloy particles comprising an iron-aluminum alloy were left in the atmosphere for three weeks but experienced almost no oxidation. That is, the ultrafine alloy particles have a low surface activity and thus are highly stable ultrafine particles (nanoparticles). Furthermore, coalescences between the particles were hardly observed in the scanning electron micrograph shown in FIG. 7.

Note that the generated ultrafine alloy particles had a yield of 38% since the amount of the ultrafine alloy particles collected per 100 g of the charged powder material was 38 g.

Comparative Example 1

Next, a comparative example will be shown in which production of ultrafine alloy particles comprising a tin-bismuth alloy was attempted but did not succeed in forming an alloy, failing in prevention of agglomeration and coalescence between particles.

As raw materials, a tin powder having an average particle size of 10 μm and a bismuth powder having an average particle size of 10 μm were used. The mixture mass ratio between the tin and bismuth was 50:50.

As to melting points of tin and bismuth, it is known that bismuth has a melting point of 271° C., which is higher than that of tin. At the temperature of the melting point of bismuth, 271° C., a vapor pressure of tin is $1.16 \times 10^{-25}$ Pa while that of bismuth is $8.93 \times 10^{-13}$ Pa, resulting in a vapor pressure ratio of $1:7.70 \times 10^{12}$ ($0.770 \times 10^{13}$) ($1.299 \times 10^{-13}:1$) on the order of 1013 difference.

Again, argon was used as the carrier gas similarly to Example 1.

And, the high frequency voltage applied to the plasma torch 12 and the supply amount of the plasma gas were the same as those used in Examples 1 and 2, and an argon/hydrogen thermal plasma flame was generated in the plasma torch 12. Note that the reaction temperature was controlled to be about 8,000° C., and the supply amount of the carrier gas from the carrier gas source 15 of the material supplying apparatus 14 was set to 10 liters/min.

Mixture of the tin powder and the bismuth powder was introduced into the thermal plasma flame 24 in the plasma torch 12 together with argon as the carrier gas.

To be introduced into the chamber 16 by the gas introduction apparatus 28, 150 liters/min of argon was ejected from the gas ejection nozzle 28a and 50 liters/min of argon was ejected from the gas ejection nozzle 28b. The flow rate in the chamber was 0.25 m/sec. The pressure in the chamber 16 was 50 kPa.

Ultrafine particles comprising tin and bismuth were generated under the above-mentioned production conditions. Observation of the generated ultrafine particles with a scanning electron microscope revealed coalescences between particles. Ultrafine particles each independently separated could not be obtained. In addition, particle growth also occurred so that bulky particles as large as over 100 nm were observed.

Figure 8:
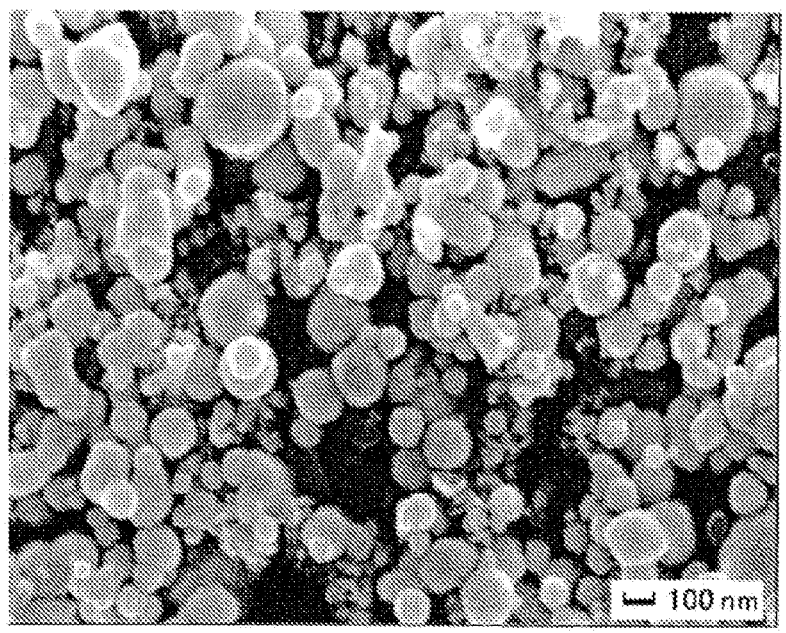
FIG. 8 is an electron micrograph of the ultrafine metal particles obtained by Comparative Example 1 (at a magnification of 50,000 times)
Figure 9:
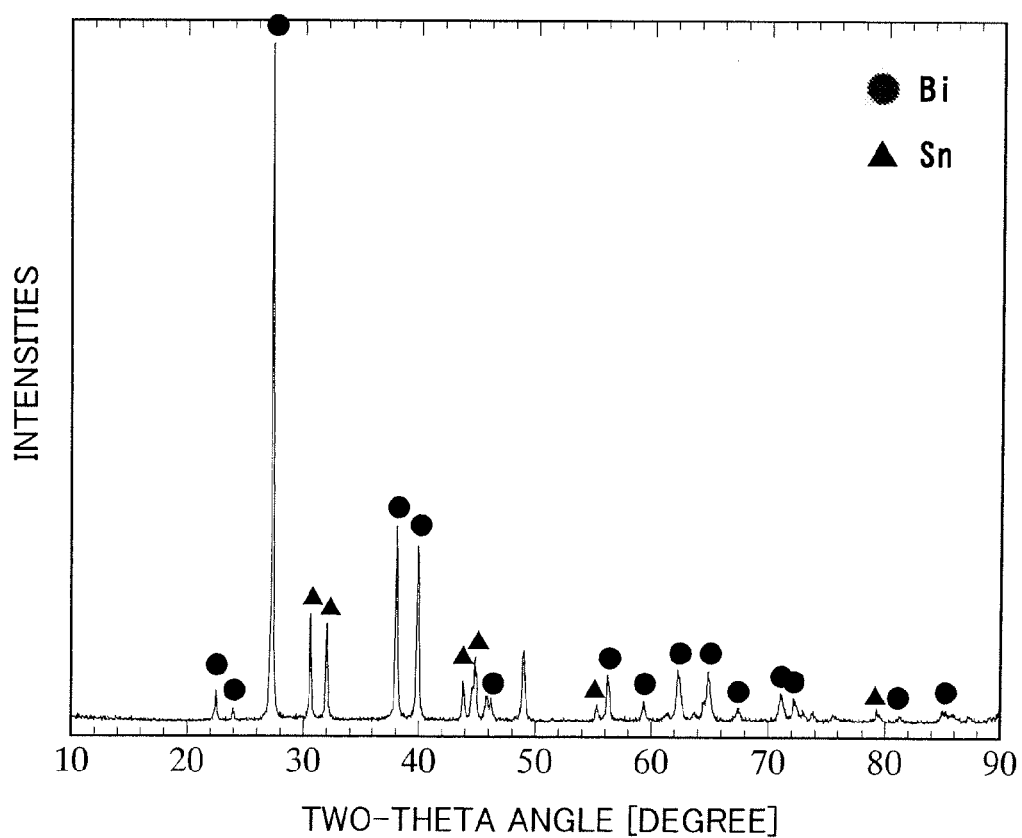
FIG. 9 is a graph showing the measurement result of X-ray diffraction of the ultrafine metal particles obtained by Comparative Example 1.

FIG. 8 shows an electron micrograph of the ultrafine particles. FIG. 9 is a graph showing the measurement result of X-ray diffraction of the obtained ultrafine particles. In the graph, the vertical axis shows intensities, while the horizontal axis shows two-theta angles.

As can be seen in FIG. 9, the X-ray diffraction pattern shows only the respective peaks of tin and bismuth and no peaks of an alloy thereof, evidencing that the obtained ultrafine particles are not alloy nanoparticles, i.e., not ultrafine alloy particles of the present invention.

Examples 3-12

Ultrafine alloy particles comprising a primary metal and a subsidiary metal were produced in Examples 3 to 12 using raw material powders in the respective combinations of the primary metal and the subsidiary metal shown in Table 1 under the same production conditions and through same processes as those in Example 1. Raw material powders of the primary metal and the subsidiary metal having average particle sizes, vapor pressure ratios (primary metal/subsidiary metal) and mixture mass ratios therebetween as shown in Table 1 were used in Examples 3 to 12.

Each particle size of the ultrafine alloy particles produced in Examples 3 to 12 was obtained similarly to Example 1.

The results are shown in Table 1.

TABLE 1

| | Average Particle Size of Raw Material Powders | | | | Mixture Mass Ratio | | | |
| --- | --- | --- | --- | --- | --- | --- | --- | --- |
| | Primary Metal | Average Particle Size (μm) | Subsidiary Metal | Average Particle Size (μm) | (Primary Metal: Subsidiary Metal) | Vapor Pressure Ratio | Ultrafine Alloy Particles | Particle Size (nm) |
| Ex. 3 | Ag | 4.5 | Cu | 5 | 85:15 | 62.5:1 | Ag—Cu | 30 |
| Ex. 4 | Ag | 4.5 | Pd | 5 | 87:13 | $1.14 \times 10^3:1$ | Ag—Pd | 30 |
| Ex. 5 | Co | 5 | Al | 5 | 90:10 | 0.42:1 | Co—Al | 15 |

TABLE 1-continued

| | Average Particle Size of Raw Material Powders | | | | Mixture Mass Ratio | | | |
| --- | --- | --- | --- | --- | --- | --- | --- | --- |
| | Primary Metal | Average Particle Size (μm) | Sub-sidiary Metal | Average Particle Size (μm) | (Primary Metal: Subsidiary Metal) | Vapor Pressure Ratio | Ultrafine Alloy Particles | Particle Size (nm) |
| Ex. 6 | Cu | 5 | Ni | 10 | 75:25 | 31.4:1 | Cu—Ni | 50 |
| Ex. 7 | Fe | 5 | Al | 5 | 98:2 | 195:1 | Fe—Al | 25 |
| Ex. 8 | Fe | 5 | Co | 5 | 75:25 | 18.5:1 | Fe—Co | 15 |
| Ex. 9 | Fe | 5 | Si | 50 | 90:10 | 0.16:1 | Fe—Si | 15 |
| Ex. 10 | Pd | 5 | Co | 5 | 88:12 | 3.40:1 | Pd—Co | 15 |
| Ex. 11 | Pd | 5 | Ti | 50 | 75:25 | 0.76:1 | Pd—Ti | 15 |
| Ex. 12 | Fe | 5 | Co Al | 5 5 | Fe:Co:Al 74:24:2 | Fe:Co:Al 195:10.5:1 | Fe—Co—Al | 30 |

Observation of surfaces of the ultrafine alloy particles with photographs taken by a scanning electron microscope revealed that all of the ultrafine alloy particles produced in Examples 3 to 12 had substantially no coalescence between particles, had low surface activities, and did not cause abrupt oxidation on particle surfaces, and thus that they were highly stable ultrafine particles (nano particles).

As described above in detail, the present invention explicitly provides the following effects.

That is, in Examples 1 to 12, the mixture mass ratios between the primary metal and the subsidiary metals in the two or more metals satisfied the required range of the present invention; in Examples 1 to 11, the vapor pressure ratio of the subsidiary metal with respect to the primary metal in the two metals was in a predetermined range ($10^{-4}:1$ to $10^4:1$ ($1:10^4$ to $1:10^{-4}$)); and in Example 12, the vapor pressure ratio of each of the subsidiary metals, cobalt and aluminum, with respect to the primary metal, iron, was also in the predetermined range, so preferable ultrafine alloy particles were produced in Examples 1 to 12. In Comparative Example 1, on the contrary, the mixture mass ratio and the vapor pressure ratio between two metals were far out of the ranges specified in the present invention so far out of the ranges specified in the present invention so that the ultrafine alloy particles of the present invention were hardly generated.

Hence, it is apparent from the above that limitations of the mixture mass ratio and the vapor pressure ratio in the present invention are quite effective.

What is claimed is:

1. A process for producing ultrafine alloy particles comprising an alloy including a primary metal and a subsidiary metal, comprising steps of:
    introducing powder materials for producing said ultrafine alloy particles into a thermal plasma flame under reduced pressure to form a vapor-phase mixture, said powder materials including said primary metal and said subsidiary metal solid-soluble in said primary metal and a content of said subsidiary metal being in a range of 1 wt % to 25 wt %, wherein said primary metal is selected from a group consisting of iron, cobalt and nickel, and said subsidiary metal is aluminum; and
    introducing cool gas toward an end portion of said thermal plasma flame in a supply amount sufficient for quenching said vapor-phase mixture so as to generate said ultrafine alloy particles capable of inhibiting coalescence or oxidation, or both, of said ultrafine alloy particles including said primary metal.

2. The process for producing ultrafine alloy particles according to claim 1, wherein a vapor pressure ratio between said primary metal and said subsidiary metal at a highest temperature among melting points of said primary metal and said subsidiary metal is in range of $1:10^4$ to $1:10^{-4}$.

* * * * *